United States Patent
Klother et al.

(10) Patent No.: US 7,228,781 B2
(45) Date of Patent: Jun. 12, 2007

(54) HYDRAULIC CONTROL IN A HYDRAULIC SYSTEM, ESPECIALLY FOR THE OPERATION OF SCRAP CUTTERS

(75) Inventors: Andreas Klother, Kaarst (DE); Karl-Heinz Post, Kaarst (DE)

(73) Assignee: Metso Lindemann GmbH (DE)

( * ) Notice: Subject to any disclaimer, the term of this patent is extended or adjusted under 35 U.S.C. 154(b) by 76 days.

(21) Appl. No.: 10/515,255

(22) PCT Filed: Mar. 27, 2003

(86) PCT No.: PCT/DE03/01022

§ 371 (c)(1),
(2), (4) Date: Nov. 19, 2004

(87) PCT Pub. No.: WO03/100264

PCT Pub. Date: Dec. 4, 2003

(65) Prior Publication Data

US 2006/0054015 A1 Mar. 16, 2006

(30) Foreign Application Priority Data

May 24, 2002 (DE) ............................... 102 23 267

(51) Int. Cl.
*F15B 11/08* (2006.01)
(52) U.S. Cl. ............................... 91/420; 91/435; 91/461
(58) Field of Classification Search ............... 91/420, 91/435, 459, 461, 494
See application file for complete search history.

(56) References Cited

U.S. PATENT DOCUMENTS

| | | | | |
|---|---|---|---|---|
| 3,906,991 A | * | 9/1975 | Haussler | 137/630.13 |
| 4,172,582 A | * | 10/1979 | Bobnar | 251/63 |
| 4,208,935 A | | 6/1980 | Kollmar | |
| 4,244,275 A | * | 1/1981 | Smilges | 91/420 |
| 4,319,504 A | | 3/1982 | Wepner et al. | |
| 4,423,859 A | | 1/1984 | Müller | |
| 4,624,445 A | * | 11/1986 | Putnam | 251/63.4 |
| 5,191,826 A | | 3/1993 | Brunner | |

(Continued)

FOREIGN PATENT DOCUMENTS

CH 543028 11/1972

(Continued)

OTHER PUBLICATIONS

International Search Report for corresponding International Application No. PCT/DE 03/01022.

*Primary Examiner*—Hoang Nguyen
(74) *Attorney, Agent, or Firm*—Polster, Lieder, Woodruff & Lucchesi, L.C.

(57) ABSTRACT

The invention relates to hydraulic control in a hydraulic system for the operation of a machine tool such as a press for processing material of a certain type, especially for the operation of the scrap cutters. Said control allows for impact attenuation and combined rapid motion switching with load compensation and transfer of a hydraulic medium of a hydraulic cylinder for the movement of the other. According to the invention, said control comprises hydraulic media of a hydraulic cylinder for pre-control of a first main valve element (2.4.0), a second main valve element (2.7.0) and a third main valve element (3.7.0) which are functionally combined and a fourth valve (2.5).

16 Claims, 1 Drawing Sheet

U.S. PATENT DOCUMENTS

| | | | | |
|---|---|---|---|---|
| 5,611,259 A | * | 3/1997 | Nagata | 91/415 |
| 5,832,807 A | * | 11/1998 | Rausch et al. | 91/420 |
| 6,098,647 A | | 8/2000 | Häussler et al. | |
| 6,502,393 B1 | | 1/2003 | Stephenson et al. | |

FOREIGN PATENT DOCUMENTS

| | | |
|---|---|---|
| DE | 2221290 | 9/1976 |
| DE | 2808091 | 8/1979 |
| DE | 2824176 | 12/1979 |
| DE | 2909118 | 9/1980 |
| DE | 2909119 | 9/1980 |
| DE | 2928777 | 2/1981 |
| DE | 3112393 | 10/1982 |
| DE | 3534467 | 7/1986 |
| DE | 4312283 | 10/1994 |
| DE | 19529134 | 2/1997 |
| EP | 0464305 | 1/1992 |
| EP | 0765203 | 6/1995 |
| EP | 1186783 | 3/2002 |
| WO | 8600849 | 2/1986 |
| WO | 9732136 | 9/1997 |

* cited by examiner

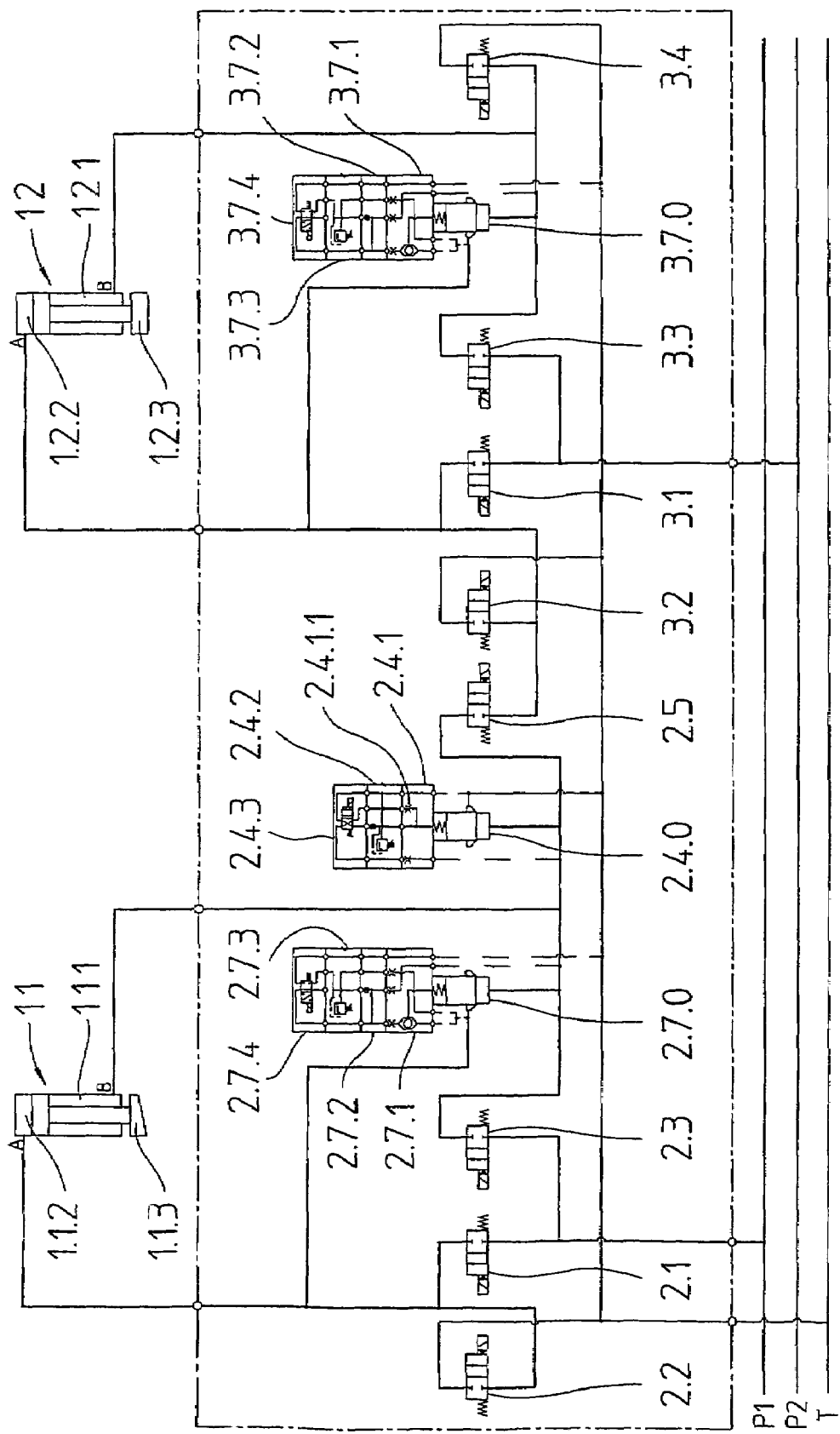

HYDRAULIC CONTROL IN A HYDRAULIC SYSTEM, ESPECIALLY FOR THE OPERATION OF SCRAP CUTTERS

CROSS-REFERENCE TO RELATED APPLICATIONS

This application is a 371 national phase application of International Application No. PCT/DE03/01022 having an international filing date of Mar. 27, 2003, and which claims priority to German Application No. DE 102 23 267.9 filed May 24, 2002.

BACKGROUND OF THE INVENTION

1. Field of the Invention

The invention relates to a hydraulic control in a hydraulic system for the operation of a machine tool such as a press for processing material of any desired type, such as presses and/or shears, in particular for shears for cutting metal scrap, such as "scrap shears".

2. Prior Art

Machine tools such as presses essentially comprise
  a column having at least one hydraulic cylinder guided and fastened therein for driving a tamper, pressing or holding down the material, toward a table and at least one hydraulic cylinder guided and fastened therein for driving a tool, finally processing and cutting the material, toward a fixed tool in said table, and
  a "hydraulic control" with tank, pumps, control blocks, valve elements and nozzles and also the hydraulic medium for the cyclic operation of the first and second cylinders.
  a "hydraulic control" with tank, pumps, control blocks, valve elements and nozzles and also the hydraulic medium for the cyclic operation of the first and second cylinders.

It is known to provide means in the hydraulic control which generate a damping pressure for damping a "(cutting) impact" at least in one of the hydraulic cylinders at the end of its working stroke, such as, for example, after the severing of metal scrap.

The general problematic nature of these (cutting) impacts has been known for a long time and has already been described in detail in publications DE 2808091A1, DE 2824176A1, DE 2909119A1, DE 3534467A1, DE 2221290C3, DE 2928777C2, DE 3112393C2 and DE 19529134A1.

A useful and already known solution to the problem can be gathered from the preamble of the main claim of EP 0765203B1 (also published as U.S. Pat. No. 5,832,807), in which case this embodiment is to be advantageously augmented by the characterizing features such as
  the control pressure corresponding to the damping pressure can be built up by inflow of control oil from the piston-side cylinder space of the working cylinder via a bypass line into the control space, and
  a check valve which shuts off flow toward the piston-side cylinder space is arranged in the bypass line.

The previously known hydraulic control can be effectively presented in the following steps with regard to the outflow relevant to the damping of the (cutting) impact (with reference to EP 0765203, also published as U.S. Pat. No. 5,832,807):

1. The cylinder descends with the cutter. A counter-pressure is generated in the rod space 12 of the cylinder by means of a pressure valve 54. The valve 54 interacts with a valve 31 as a two-stage pressure-limiting valve, the valve 31 constituting the main stage. A valve 38 is held by a spring in the position P-A, since the control pressure in line 40 at this instant is still low. The counter-pressure in the rod space during the downward travel is necessary in order to hold the load attached to the cylinder. Without this counter-pressure, the cylinder, due to the weight of the piston rod and the attached load G, would travel faster than predetermined by the pump quantity due to gravitational effects. This would result in a vacuum in the piston space 10, and this vacuum can cause problems with the seals of the cylinder.

2. The cylinder, or the cutter, comes down on the material. The pressure in the piston space 10 increases, since at this point the cylinder is no longer moved. The pump continues to deliver oil, which leads to a pressure increase in the piston space 10. This pressure increase continues via the control line 62, the valve 58 and the line 40 and leads to shifting of the valve 38 into position A-T. Accordingly, the control space of the valve 31 is connected via a nozzle 21 and the valve 38 to the tank; and the valve 31 opens against the spring 66. As a result, the previously required counter-pressure in the annular space 12 of the cylinder collapses. The cylinder can now apply the full desired force, defined by pressure times piston area, for cutting the material. The cutter cuts the material when the cutting force is reached.

3. The cutter is accelerated by the oil volume, acting as a spring, in the piston space. Immediately after the cutting, the pressure in the piston spaces 10 collapses through expansion. At the same time, the valve 38, in the absence of control pressure, shifts back into basic position P-A. The oil flow produced by the accelerated cylinder is partly directed via the nozzle 36 and the valve 38 to the control space of the valve 31. The top pressure on the annular-space side is limited, as in section 3.1, via the two-stage pressure-limiting valve (54/31). This counter-pressure already constitutes a (cutting) impact damping.

4. As can be seen under 2, before cutting, the pressure in the piston space 10 is high and the pressure in the annular space 12 is relieved toward the tank. Since the pressure in the piston space 10 is now higher than in the annular space 12, oil flows via the line 68 and the nozzles 70 and 36 and the check valve 72 from the piston space to the annular space and thus via the valve 31 to the tank. This oil flow multiplied by the applied pressure can adversely produce an unintentional power loss.

During the cutting (as described in 3), the pressure in the piston space 10 collapses, at least partly. Since the pressure in the piston space 10 has decreased and pressure has been generated in the annular space by the accelerated cylinder, there is the risk that no oil can flow via the line 68. The pressure gradient then becomes opposed to the check valve.

The line 68 will therefore also lead to a mutual effect instead of assisting damping. Furthermore, it is to be emphasized that the valve 38 must first of all shift into the basic position for the desired (cutting) impact damping to come into effect. The precondition for this is that the pressure in the line 40 (thus previously in the piston space 10) must have collapsed. Thus, in particular cases, no oil can flow via the line 68 and accordingly via the valve 38, since this at best requires additional means on account of the circuit logic and the oil required is fed via the nozzle 36 of the pilot control.

In addition, the (cutting) impact damping present per se is accordingly to be assisted with simple means by the 4th step, which, however, does not appear possible without further means or may lead to further complications.

The hydraulic controls already realized in industrial practice with the features (in accordance with the steps 1 to 3 described above) defined in the preamble of abovementioned EP 0765203B1 (also published as U.S. Pat. No. 5,832,807), in particular in scrap shears, have proved to be functional with regard to (cutting) impact damping; however, they are in need of improvement in the context of a complex hydraulic problem. With regard to the effectiveness of the technical means of the function described in step 4, this would only be partly realizable and only if additional means were to be used. This means at least a considerable cost outlay.

According to DE 4312283A1, the search for a solution approaches, such as, for example, in large, but continuously working channel baling presses, a control for a hydraulic heavy-duty actuator which is to be controlled under load from an extended working position into a return movement, a hydraulically pressurized working space of the actuator being connected to a return line of low pressure via a directional control valve, the valve position of which is set hydraulically via a control line which has at least one choke orifice.

In this case, a pressure-stabilizing delay element is connected in between the directional control valve and the choke orifice.

If the mode of operation of this control is analyzed with regard to the machine of the design mentioned at the beginning, valve operation for reducing relief impacts is certainly presented and a bracketed pressure from a system is reduced as smoothly as possible in order to reduce impacts extending into the tank line.

However, the rapid buildup of a counter-pressure in a cylinder and then also thus the limiting of this counter-pressure by this measure is not possible.

An approach to the solution of the present problem does not follow from this disclosure.

The aim of building up a counter-pressure as rapidly as possible and of limiting it in a cylinder of the machines of the generic type, taking into account their specific mode of operation, also cannot be achieved by the solution according to EP 1186783A1. According to this patent, only the oil flowing off from one cylinder is used for generally applying pressure to and driving a second cylinder. This effect is assumed to be known in order to actually fulfill the basic function of the hydraulic control in these machines.

It can therefore be stated that the problem of the (cutting) impact damping by means of hydraulic control for presses, and in particular shears for cutting metal scrap, defined at the beginning has hitherto not been solved comprehensively within the scope of the entire hydraulic system.

Thus, the volume of the hydraulic medium provided by the pumps in hydraulic controls for machine tools such as presses, and in particular shears for cutting metal scrap, constitutes a limit to the speed of the sequences of hydraulic cylinders, since the hydraulic medium flowing to the tank remains unused as a rule. There is also that fact that perpendicularly working hydraulic cylinders, such as in presses or shears, with attached masses of, for example, tools impose special demands on the hydraulic control. If the annular space of the cylinder is simply relieved toward the tank during the downward travel of this cylinder, the extension being effected downward, the piston of the cylinder could descend due to the dead mass and the attached load and could possibly run in advance of the action of the pumps. This has an adverse effect at least on the service life of the cylinder seals and may also be disadvantageous for the entire hydraulic system.

Finally, in conventional hydraulic controls for uses described above, with the simultaneous upward movement of two cylinders, the cycle time of the processing operation, such as after the shearing for example, is considerably restricted.

BRIEF SUMMARY OF THE INVENTION

These problems, in their entirety, associated per se with the corresponding hydraulic system, such as
  (cutting) impact damping with simple means and/or
  rapid-motion control with load compensation and/or
  oil transfer with increase in output as a complex hydraulic control of the application described at the beginning, give rise to the definition of the object according to the invention.

The object of the invention is to provide a hydraulic control in a hydraulic system for the operation of a machine tool such as a press for processing material of any desired type, in particular for scrap shears, which, in a functional combination of partly known features,
  produces (cutting) impact damping with little constructional outlay in terms of hydraulic means, with which (cutting) impact damping the maximum counter-pressure on the annular-space side of the cylinder can be set at a higher level than in conventional solutions for generating a counter-pressure, and/or
  links rapid-motion control with load compensation and uses the hydraulic medium flowing off in a conventional manner to the tank, and/or
  reduces the cycle time and increasing increases the output of the machine, during the simultaneous upward movement of two cylinders, by using the outflowing hydraulic medium of one of the cylinders for driving or moving the other cylinder at the same pump delivery quantity.

In effect, a complex hydraulic control in the hydraulic system for the operation of machine tools, such as presses, and in particular scrap shears, is provided which, in addition to the solved problem of functionally simple but functionally fully effective impact damping, increases the output rates of the material to be processed without increasing the installed capacity and the construction cost, whereby the operator can also be provided with a machine having a higher energy service value.

The invention is explained with reference to an exemplary embodiment according to the scheme of the hydraulic circuit for the operation of scrap shears with the aid of the drawings.

BRIEF DESCRIPTION OF THE DRAWING

The circuit corresponding to the hydraulic system according to the invention is schematically shown in the drawing. In the drawing, the line _._. outlines the actual control.

DETAILED DESCRIPTION OF THE INVENTION

In the drawing a first hydraulic cylinder 1.1 which drives a tool, such as a cutter slide with the cutter 1.1.3 which cuts material and a second hydraulic cylinder 1.2 which drives a further tool, such as a tamper 1.2.3 for holding down the material to be cut, are shown in a simplified manner. The cylinders 1.1 and 1.2 have bottom spaces 1.1.2 and 1.2.2, respectively and annular spaces 1.1.1 and 1.2.1, respectively. The hydraulic inlets or outlets for the hydraulic medium of the bottom spaces 1.1.2, 1.2.2 in both cylinders 1.1 and 1.2 are designated by A and the inlets and outlets for the hydraulic medium of the annular spaces 1.1.1, 1.2.1 are designated by B. T symbolizes the line to a tank or reservoir (not shown), and P1 and P2 symbolize the connections to the pressure lines and the pumps (not shown).

The basic circuit of the hydraulic control for the operation of the scrap shears is first of all preset with a second valve 2.2 between the bottom space 1.1.2 of the first hydraulic cylinder 1.1 and the tank or reservoir T and with a third valve 2.3 between the annular space 1.1.1 and the connection to the pressure supply P1.

Furthermore, a fifth valve 3.1 is provided between the bottom space 1.2.2 of the second hydraulic cylinder 1.2 and the connection to the pressure supply P2 and a sixth valve 3.2 is provided between the bottom space 1.2.2 and the tank or reservoir T.

Finally, a seventh valve 3.3 is arranged between the annular space 1.2.1 and the connection to the pressure supply P2 and an eighth valve 3.4 is arranged between the annular space 1.2.1 and the tank or reservoir T.

The function of the hydraulic control, which acts in the hydraulic system in accordance with the definition of the object, is explained in more detail in subsections I, II and III below.

I. Functional Part—(Cutting) Impact Damping

In scrap shears, the cutter slide 1.1.3 with the connected piston of the cylinder 1.1 is accelerated after the shearing of the material. The cause of the acceleration is a high pressure in the bottom space 1.1.2 of the cylinder 1.1 up to just before the cut occurs. The compressed volume of the hydraulic medium acts as an energy store. The compressed hydraulic medium accelerates the cylinder 1.1 with cutter slide 1.1.3. Before the cutting or shearing, the annular space 1.1.1 of the cylinder 1.1 is relieved. In order to counteract the acceleration of the cutter slide 1.1.3 and a resulting hydraulic impact, a counter-pressure is generated in the annular space 1.1.1 of the cylinder 1.1, this counter-pressure being suitable for damping the hydraulic impact.

At the instant directly before the material is cut through, a first valve 2.1 (not previously mentioned) between the bottom space 1.1.2 and the connection to pressure supply P1 and a pilot-control valve 2.4.3 (not previously mentioned) are in an operated position. As a result, the bottom space 1.1.2 of cylinder 1.1 is connected via the first valve 2.1 to the connection to the pressure supply P1, which is fed by hydraulic pumps (not shown). The annular space 1.1.1 of the first hydraulic cylinder 1.1 is relieved toward the tank (not shown) via a first main valve element 2.4.0 with a cap 2.4.1.

The drive motors (not shown) of the hydraulic pumps are protected against overload by a suitable output limit of the pumps. This output limit sets a lower delivery flow rate of the hydraulic medium at high pressures, so that the product of pressure and volumetric flow, which product corresponds to the hydraulic power, remains virtually constant. Accordingly, the volumetric flow rate of the hydraulic medium is low at high pressures compared with the volumetric flow rate at low pressures. The speed of the first hydraulic cylinder 1.1 is therefore also lower at high pressures compared with that at low pressures.

The opening stroke of the first main valve element 2.4.0 is adapted by an integrated spring (not designated) to the volumetric flow via the relevant valve.

During an abrupt rapid movement of the piston of the first hydraulic cylinder 1.1 (as described above), the first main valve 2.4.0 is delayed in its opening movement by a nozzle 2.4.1.1 essential to the invention. At the same time, the pressure in the annular space 1.1.1 of the cylinder 1.1 is set by the pressure valve 2.4.2, as pilot control of the first main valve element 2.4.0, to the pressure set at the pressure valve 2.4.2. The delay in the opening of the second main valve element 2.4.0 is surprisingly sufficient for generating a limited counter-pressure and thus for (cutting) impact damping.

Consequently, with simple means and in an advantageous manner, the maximum counter-pressure on the annular space side 1.1.1 of the first hydraulic cylinder 1.1 can be set higher than in the previously known solutions for generating a counter-pressure, whereby this partial solution can also be realized with less outlay in terms of construction.

II. Functional Part—Rapid-Motion Control Linked with Load Compensation

The delivery volume made available by the pumps has hitherto constituted a limit in the cylinder speed in hydraulic scrap shears, in which case the hydraulic medium flowing in a conventional manner to the tank is now to be utilized. Furthermore, perpendicularly working hydraulic cylinders 1.1 and 1.2 with attached loads due to the weight of the tools, such as cutter slide 1.1.3 and tamper 1.2.3, are to be controlled in a special manner.

If the annular spaces 1.1.1 and 1.2.1 were simply to be relieved toward the tank T during the downward travel of the cylinders 1.1 and 1.2, in the course of which the extension is effected downward, the respective piston of the hydraulic cylinders 1.1 and 1.2 could descend due to the dead weight caused by the attached load of said tools and could move in advance of the action of the hydraulic pumps. This would have adverse effects on the service life of the cylinder seals.

As a countermeasure during the downward travel in the respective annular space 1.1.1, 1.2.1, a pressure is to be generated which is large enough to compensate for the attached load, such as the tools for example. It has been determined in pilot tests that a pressure difference between annular spaces 1.1.1, 1.2.1 and bottom spaces 1.1.2 and 1.2.2 of the hydraulic cylinders 1.1, 1.2 is suitable for compensating for the load due to weight. At the same time, the hydraulic medium flowing off at B on the annular-space side is to be used for the purposes of a conventional rapid-motion control.

By means of the circuit according to the drawing, both requirements are realized in a combined manner by virtue of the fact that a second main valve element 2.7.0 with a cap 2.7.1, an intermediate plate 2.7.2, a pressure valve or choke (nozzle) 2.7.3 and a directional control valve 2.7.4 and, similarly, a third main valve element 3.7.0 with a cap 3.7.1, an intermediate plate 3.7.2, a pressure valve or choke (nozzle) 3.7.3 and a directional control valve 3.7.4 are arranged according to the invention.

These circuits are especially advantageous for downward movements with a low counterforce on the hydraulic cylinders 1.1, 1.2.

The respective valve combination, from the second and third main valve element 2.7.0, 3.7.0, interacts with a pilot-control arrangement which is formed by the cap 2.7.1, 3.7.1, intermediate plates 2.7.2, 3.7.2, pressure valves or chokes (nozzles) 2.7.3, 3.7.3 and the directional control valves 2.7.4, 3.7.4.

This pilot-control arrangement, in the linking according to the drawing, in combination with the respective main valve element 2.7.0, 3.7.0, constitutes a controllable pressure valve having a check function, in which case the pressure on the annular-space side can be set relative to the pressure on the piston side so as to be matched to the hydraulic cylinders 1.1, 1.2.

An alternative combination of a separate rapid-motion valve with load-compensation function could constitute an optimum solution from the energy point of view.

III. Functional Part—Transfer of the Hydraulic Medium

During the simultaneous upward movement of two cylinders 1.1, 1.2 as described above, the outflowing hydraulic medium of one of the cylinders 1.1, 1.2 is to be used for moving the other cylinder 1.1, 1.2. The quantity of hydraulic medium which is thus obtained compared with conventional concepts considerably reduces the cycle time of the press, and in particular of scrap shears, at the same pump delivery quantity.

The circuit according to the invention produces an increase in output compared with conventional concepts. The circuit for such use of the outflowing hydraulic medium is realized according to the invention by a fourth or switch valve 2.5 between the bottom space 1.2.2 of cylinder 1.2 and the annular space 1.1.1 of cylinder 1.1. In the circuit shown, the cylinders 1.1, 1.2 driven via the outflowing medium can be additionally driven with further pumps.

INDUSTRIAL APPLICABILITY

Although the invention is specifically explained with regard to the hydraulic system of scrap shears, it can be applied to the operation of machine tools such as presses of the generic type mentioned at the beginning in which, to all intents and purposes, the complex problem of impact damping, rapid-motion control with load compensation, and/or transfer of the hydraulic medium between at least two hydraulic cylinders is to be solved.

LIST OF DESIGNATIONS 1.1 First hydraulic cylinder for driving a tool such as 1.1.3
1.1.1 Annular space
1.1.2 Bottom space
1.1.3 Cutter slide with cutter
1.2 Second hydraulic cylinder for driving a tool such as 1.2.3
1.2.1 Annular space
1.2.2 Bottom space
1.2.3 Tamper for holding down the material
2.1 First valve between bottom space 1.1.2 and P1
2.2 Second valve between bottom space 1.1.2 and tank T
2.3 Third valve between annular space 1.1.1 and P1
2.4.0 First main valve element
2.4.1 Cap
2.4.1.1 Nozzle
2.4.2 Pressure valve
2.4.3 Pilot-control valve
2.5 Fourth or switch valve between bottom space 1.2.2 and annular space 1.1.1
2.7.0 Second main valve element
2.7.1 Cap
2.7.2 Intermediate plate
2.7.3 Pressure valve or choke (nozzle)
2.7.4 Directional control valve
3.1 Fifth valve between bottom space 1.2.2 and P2
3.2 Sixth valve between bottom space 1.2.2 and tank T
3.3 Seventh valve between annular space 1.2.1 and P2
3.4 Eighth valve between annular space 1.2.1 and tank T
3.7.0 Third main valve element
3.7.1 Cap
3.7.2 Intermediate plate
3.7.3 Pressure valve or choke (nozzle)
3.7.4 Directional control valve
A Inlet/outlet, bottom space
B Inlet/outlet, annular space
P1 Connection to the pressure supply
P2 Connection to the pressure supply
T Connection to the tank or reservoir

The invention claimed is:

1. A hydraulic control system for operating a machine tool for processing material, comprising at least one hydraulic cylinder having a bottom space (1.1.2) and an annular space (1.1.1), and hydraulic means for setting a higher maximum counter-pressure in the annular space (1.1.1) for impact damping, said hydraulic means comprising:
   a first main valve element (2.4.0) disposed in a fluid flow line from said annular space (1.1.1) to a hydraulic fluid reservoir (T),
   a nozzle (2.4.1.1) for delaying opening movement of the first main valve element (2.4.0) in case of sudden rapid movement of said cylinder; and
   a pressure valve (2.4.2) for simultaneously limiting, as pilot control of the first main valve element (2.4.0), the pressure in the annular space (1.1.1) in said cylinder (1.1) to a pressure set at the pressure valve (2.4.2);
   said nozzle (2.4.1.1) and pressure valve (2.4.2) causing the generation of a limited counter-pressure for impact damping in said annular space (1.1.1), said impact damping being assisted by a pilot-control valve (2.4.3) controlling the first main valve element (2.4.0).

2. A hydraulic control system for operating a machine tool for processing material having at least two hydraulic cylinders (1.1, 1.2) each having a bottom space (1.1.2, 1.2.2) and an annular space (1.1.1, 1.2.1), and comprising:
   a. hydraulic means for setting a higher maximum counter-pressure in the annular space (1.1.1) of a first (1.1) of said at least two hydraulic cylinders for impact damping including:
      a first main valve element (2.4.0) disposed in a fluid flow line from said annular space (1.1.1) to a hydraulic fluid reservoir (T),
      a nozzle (2.4.1.1) for delaying opening movement of the first main valve element (2.4.0) in case of sudden rapid movement of said cylinder (1.1); and
      a pressure valve (2.4.2) for simultaneously limiting, as pilot control of the first main valve element (2.4.0), the pressure in the annular space (1.1.1) in said first cylinder (1.1) to a pressure set at the pressure valve (2.4.2);
      said nozzle (2.4.1.1) and said pressure valve (2.4.2) causing the generation of a limited counter-pressure for impact damping in said annular space (1.1.1), said impact damping being assisted by a pilot-control valve (2.4.3) for controlling the first main valve element (2.4.0);
   b. rapid-motion control and load compensation means utilizing the hydraulic fluid flowing from the annular spaces (1.1.1, 1.2.1) of the hydraulic cylinders (1.1, 1.2) to a hydraulic fluid reservoir (T), said rapid-motion control and load compensation means comprising:
- a second main valve element (2.7.0) disposed in a fluid flow line in fluid communication with the bottom space (1.1.2) and the annular space (1.1.1) of said first cylinder (1.1), and a first pilot-control arrangement controlling the second main valve element (2.7.0) to set the pressure in the annular space (1.1.1) of first said cylinder (1.1) to exceed the pressure of the bottom space (1.1.2) thereof by a predetermined value, and
- a third main valve element (3.7.0) disposed in a fluid flow line in fluid communication with the bottom space (1.2.2) and the annular space (1.2.1) of the second cylinder (1.2), and a second pilot-control arrangement controlling said third main valve element (3.7.0) to set the pressure in the annular space (1.2.1) of said second cylinder (1.2) to exceed the pressure in the bottom space (1.2.2) of said second cylinder (1.2) by a predetermined value; and c. means using the outflowing hydraulic fluid from one (1.2) of said at least two hydraulic cylinders for driving the other (1.1) of said at least two hydraulic cylinders at the same pump delivery rate, for reducing the cycle time and for increasing the output of the machine tool during simultaneous upward movement of said cylinders (1.1, 1.2), said means including a switch valve (2.5) adapted to place the bottom space (1.2.2) of said one (1.2) of said cylinders in fluid communication with the annular space (1.1.1) of the other cylinder (1.1) so that the outflowing hydraulic medium of said one cylinder (1.2) is usable for moving the other cylinder (1.1).

3. The hydraulic control system as claimed in claim 2, further including at least one accumulator connected to at least one of said pressure valve (2.4.2) and said pilot-control valve (2.4.3) of said first main control valve element (2.4.0).

4. The hydraulic control system as claim in claim 2, wherein said second and third main valve elements (2.7.0, 3.7.0) are provided with pressure valves or chokes (2.7.3, 3.7.3) for setting the pressure difference between said annular spaces (1.1.1, 1.2.1) of said cylinders (1.1, 1.2) and the hydraulic fluid reservoir (T).

5. The hydraulic control system as claimed in claim 2, wherein in that at the instant before sudden rapid movement of said one cylinder (1.1) a first valve (2.1) between the bottom space (1.1.2) and the reservoir (T) and said pilot-control valve (2.4.3) are in an operated position.

6. The hydraulic control system as claimed in claim 5, wherein the bottom space (1.1.2) of said one cylinder (1.1) is connectable by the first valve (2.1) to a pressure fluid supply line (P1).

7. The hydraulic control system as claimed in claim 2, wherein the annular space (1.1.1) of said one cylinder (1.1) is adapted to be relieved toward the hydraulic fluid reservoir via the first main valve element (2.4.0).

8. The hydraulic control system as claimed in claim 2, wherein the opening stroke of the first main valve element (2.4.0) is adaptable by an integrated spring to the volumetric flow of the hydraulic medium through the first main valve element (2.4.0).

9. The hydraulic control system as claimed in claim 2, wherein the first and second pilot-control arrangements are each provided with a cap, an intermediate plate, pressure valve or choke, and a directional control valve (2.7.1, 2.7.2, 2.7.3, 2.7.4 and 3.7.1, 3.7.2, 3.7.3, 3.7.4) and form, in combination with the respective main valve elements (2.7.0, 3.7.0), controllable pressure valves with check function to set the pressure in the annular spaces (1.1.1, 1.2.1) relative to the bottom spaces (1.1.2, 1.2.2) of the cylinders (1.1, 1.2) or the pressure in the annular spaces of the cylinders (1.1, 1.2) relative to the reservoir pressure.

10. The hydraulic control system as claimed in claim 5, wherein a second valve (2.2) is arranged between the bottom space (1.1.2) of the first cylinder (1.1) and the reservoir (T), a third valve (2.3) is arranged between the annular space (1.1.1) of the first cylinder (1.1) and a first pressure fluid supply line (P1), a fifth valve (3.1) is arranged between the bottom space (1.2.2) of the second cylinder (1.2) and a second pressure fluid supply line (P2), a sixth valve (3.2) is arranged between the bottom space (1.2.2) of the second cylinder (1.2) and the reservoir (T), a seventh valve (3.3) is arranged between the annular space (1.2.1) of the second cylinder (1.2) and the second pressure fluid supply line (P2), and an eighth valve (3.4) is arranged between the annular space (1.2.1) of the second cylinder (1.2) and the reservoir (T).

11. The hydraulic control system as claimed in claim 10, further including software for controlling the functions
- impact damping
- rapid motion control with load compensation, and
- use of the outflowing medium of one of the cylinders for driving the other
- by means of said first, second and third valves (2.1, 2.2, 2.3); the first main valve element (2.4.0) with cap (2.4.1), nozzle (2.4.1.1), pressure valve (2.4.2), and pilot control valve (2.4.3); the switch valve (2.5) forming a fourth valve; the second and third main control valve elements (2.7.0, 3.7.0), each provided with a cap (2.7.1, 3.7.1), an intermediate plate (2.7.2, 3.7.2), pressure valve (2.7.3, 3.7.3) and directional control valve (2.7.4, 3.7.4); and the fifth, sixth, seventh and eighth valves (3.1, 3.2, 3.3, 3.3 and 3.4).

12. The hydraulic control system as claimed in claim 1, further including at least one accumulator connected to at least one of said pressure valve (2.4.2) and said pilot control valve (2.4.3).

13. The hydraulic control system as claimed in claim 1, further including a valve (2.1) between the bottom space (1.1.2) and said reservoir (T), wherein at the instant before the sudden rapid movement of said cylinder (1.1) said valve (2.1) and said pilot-control valve (2.4.3) are in an operated position.

14. The hydraulic control system as claimed in claim 13, wherein the bottom space (1.1.2) of said cylinder (1.1) is connectable via the valve (2.1) to a pressure fluid supply line (P1).

15. The hydraulic control system as claimed in claim 1, wherein the annular space (1.1.1) of said cylinder (1.1) is adapted to be relieved towards said reservoir (T) via the first main valve element (2.4.0).

16. The hydraulic control system as claimed in claim 1, wherein the opening stroke of the first main valve element (2.4.0) is adaptable by an integrated spring to the volumetric flow of the hydraulic fluid via the first main valve element (2.4.0).

* * * * *